United States Patent [19]
Heinicke

[11] 3,947,746
[45] Mar. 30, 1976

[54] SINGLE-ENDED DC-TO-DC CONVERTER FOR THE PULSE CONTROL OF THE VOLTAGE AT AN INDUCTIVE LOAD AS WELL AS METHOD FOR ITS OPERATION

[75] Inventor: Harald Heinicke, Erlangen, Germany

[73] Assignee: Siemens Aktiengesellschaft, Munich, Germany

[22] Filed: Dec. 30, 1974

[21] Appl. No.: 537,374

[30] Foreign Application Priority Data
Jan. 14, 1974 Germany............................ 2401596

[52] U.S. Cl. ........................ 321/2; 307/34; 307/66; 320/53; 321/19; 321/45 R; 321/45 C
[51] Int. Cl.²............................................ H02M 3/315
[58] Field of Search ............ 307/17, 29, 31, 32, 33, 307/34, 38, 64, 66, 82, 252 J, 252 K, 252 M; 321/2, 18, 19, 20, 45 R, 45 C

[56] References Cited
UNITED STATES PATENTS
| | | |
|---|---|---|
| 3,372,329 | 3/1968 | Steimel et al. ..................... 321/45 R |
| 3,434,030 | 3/1969 | Bedford .............................. 321/45 R |
| 3,543,130 | 11/1970 | Reijnders ................................ 321/2 |

*Primary Examiner*—A. D. Pellinen
*Attorney, Agent, or Firm*—Kenyon & Kenyon Reilly Carr & Chapin

[57] ABSTRACT

A single-ended dc-to-dc converter which comprises a transformer having a primary winding which is connected to a d-c voltage source via a switch, a secondary winding which is connected to a load via a series valve and a choke, and a remagnetizing winding. In order to obtain an output voltage from the converter which is higher or lower, as desired, than the d-c supply voltage, provision is made for a first controlled by-pass valve to be shunted across the series connection of the secondary winding and the series valve and for a second controlled by-pass valve, poled in the direction of the load current, to be connected in parallel with the series connection of the choke and the load.

23 Claims, 5 Drawing Figures

SINGLE-ENDED DC-TO-DC CONVERTER FOR THE PULSE CONTROL OF THE VOLTAGE AT AN INDUCTIVE LOAD AS WELL AS METHOD FOR ITS OPERATION

BACKGROUND OF THE INVENTION

1. Field of the Invention

The invention concerns a single-ended dc-to-dc converter and, in particular, a single-ended dc-to-dc converter for the pulse control of the voltage at an inductive load. 2. Description of the Prior Art A single-ended dc-to-dc converter of the transformer type in use today typically comprises: a primary winding which is connected to a d-c voltage source via a switch; a secondary winding which is connected, via a series valve and a choke, to a load with which a by-pass valve is associated; and a magnetization reversal winding which is connected to the d-c voltage source via a limiting resistor in such a manner that the magnetization reversing current flowing in the magnetization reversal winding magnetizes the magnetic core of the transformer in a direction opposite that of the primary current in the primary winding.

Such a prior art dc-to-dc converter is used to convert a fixed d-c supply voltage into a d-c output voltage of variable magnitude (German Auslegeschrift 1,267,322). Moreover, the switch used in such a prior art converter is typically a controlled valve, particularly a thyristor (SCR), included in a d-c control element, while the by-pass valve employed therein is usually an uncontrolled diode, the latter generally being shunted directly across the load.

If in such a single-ended dc-to-dc converter a d-c element is, in fact, used as the switch, the quenching capacitor of the control element is recharged by means of the energy which is stored in the inductances between the d-c control element and the bypass valve. Such recharging is broken off when the capacitor voltage reaches the d-c supply voltage of the d-c voltage source. If the d-c voltage source has only a small d-c voltage and/or if the load current is very large, the capacity of the quenching capacitor must be made very large, so that a charge energy sufficient for extinguishing the main valve is available. Unfortunately, having to employ such a large capacity capacitor considerably increases the cost of the converter and, thus, is quite undesirable. Moreover, a further disadvantage of such a prior art dc-to-dc converter is that the d-c output voltage derived therefrom is generally fixed at a value which is above the value of the d-c supply voltage. In some applications, however, it may be desirable to have a d-c output voltage available at the output of the converter which is of a higher or of a lower value, as desired, than the d-c supply voltage.

It is therefore an object of the present invention to develop a single-ended dc-to-dc converter whose d-c output voltage can be higher or also lower than the d-c supply voltage. Such a single-ended dc-to-dc converter would, therefore, be suited for so-called two-quadrant operation.

SUMMARY OF THE INVENTION

According to this invention, the above and other objectives are realized by including in a single-ended dc-to-dc converter of the above-described type a first controlled by-pass valve which is shunted across the series connection of the converter secondary winding and the series valve, and, in addition, a second by-pass valve, poled in the direction of the load current, which is connected parallel to the series connection of the converter choke and the load and which preferably is also controlled.

By including such by-pass valves in the converter, the quenching capacitor of the d-c control element, if such element is used as the converter switch, can be charged beyond the magnitude of the d-c supply voltage when the bypass valves are cut off. Thus, by controlling the firing of one or both of the bypass valves, the charging of the quenching capacitor can be controlled so that it breaks off only after the negative capacitor voltage has reached a predetermined limit. This allows a reduction of the heretofore high costs in the design of the quenching capacitor. Regarding the operation of the two by pass valves, it should be noted that they can be controlled so that they fire together or at different times.

According to another aspect of the invention, a first method of operating the dc-to-dc converter of the invention is described which permits a d-c output voltage to be obtained whose magnitude is greater than that of the d-c supply voltage. In particular, this is accomplished, according to the invention, by triggering the first and second controlled by-pass valves together at a time when the absolute value of the negative voltage at the secondary winding of the transformer exceeds a predetermined limit which is above the magnitude of the d-c supply voltage of the d-c voltage source. In accord with this first method, moreover, the d-c output voltage can be made to change by providing that the on-off ratio of the switch be varied and, in addition, that the points in time when the by-pass valves are fired together be periodically held constant.

According to still another aspect of the invention, a second method of operating the dc-to-dc converter of the invention is described which permits a d-c output voltage to be obtained whose magnitude is below the value of the d-c supply voltage.

More specifically, this is realized, according to the invention, by firing the second controlled by-pass valve at a point in time when the absolute value of the negative voltage at the secondary winding of the transformer exceeds a predetermined limit which is above the value of the d-c supply voltage of the d-c voltage source, and by subsequently firing the first controlled bypass valve at a time later than the aforesaid point in time by a predetermined time interval. Furthermore, in accord with this second method, the d-c output voltage can be made to vary by providing that the on-off ratio of the switch be kept constant, the point in time for firing the second by-pass valve be fixed, and the point in time for firing the first by-pass valve be varied.

It should be pointed out, moreover, that, in accord with the invention, provision is made to permit going from one of the aforesaid methods of operation to the other and vice versa.

BRIEF DESCRIPTION OF THE DRAWING

The above and other features and aspects of the present invention will be made clearer by making reference to the following detailed description, viewed in conjunction with the accompanying drawings, in which.

DETAILED DESCRIPTION

It should be noted that, in the discussion to follow, the same reference symbols have been used in the figures to designate similar components.

Figure 1:
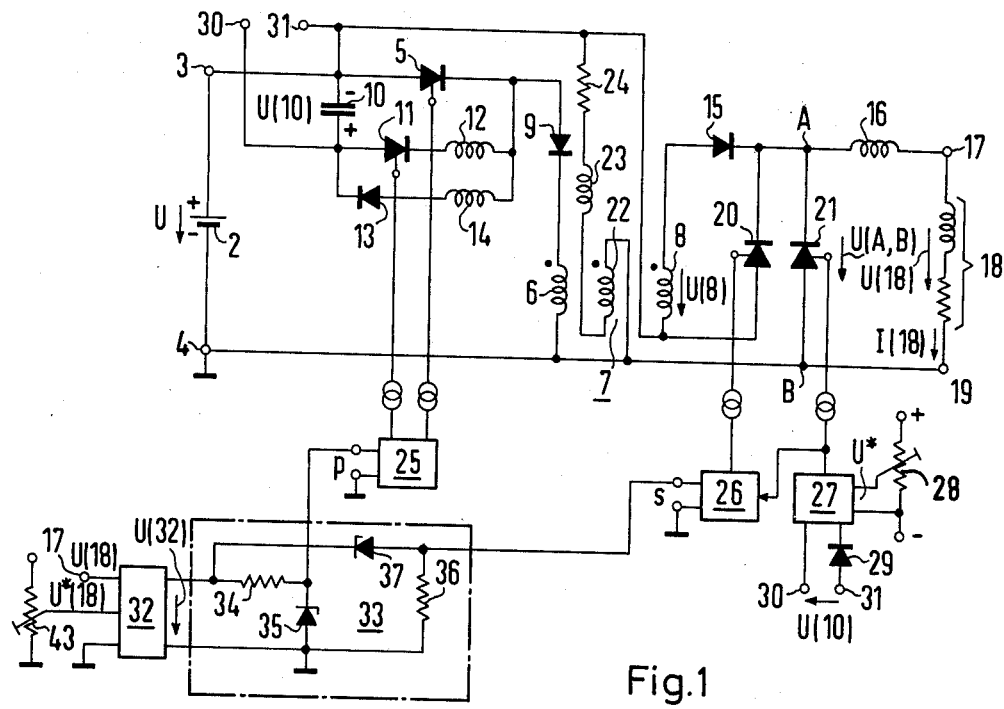
FIG. 1 shows a single-ended dc-to-dc converter which includes two controlled by-pass valves.

FIG. 1 shows a single-ended dc-to-dc converter in accordance with the invention which can be used, for instance, as an interruption-free power supply. A d-c voltage source 2 with the d-c supply voltage U, e.g., an uncontrolled rectifier with heavily varying d-c supply voltage U, is connected at its terminals 3 and 4 to a series circuit which comprises a main valve 5 that can be fired and extinguished, and the primary winding 6 of a transformer 7. The secondary winding of the transformer 7 is designated 8. The turns ratio between the primary winding 6 and the secondary winding 8 may be, for instance, 1:1. An uncontrolled series valve 9 can further be added to the series circuit.

The main valve 5, which typically, might be a thyristor, is part of a d-c control element, which may, in principle, be of any design and which further comprises a quenching arrangement and a reversing arrangement. This d-c control element acts as a switch for the primary current flowing through the primary winding 6. The quenching arrangement is connected parallel to the main valve 5. By means of it, the main valve can be extinguished again after being fired. In the present embodiment, the quenching arrangement comprises a quenching capacitor 10 in series with a controlled quenching valve 11, the latter valve, also, typically, being a thyristor. The series connection of capacitor 10 and valve 11, in turn, is connected between the anode and the cathode of the main valve 5. As shown, the quenching arrangement, if desired, might further include a quenching choke 12 connected in series with diode 11. The reversing arrangement, on the other hand, comprises the series connection of an uncontrolled reversing valve 13 and a reversing choke 14, such serially connected elements being connected antiparallel as shown to the quenching valve 11, and, if applicable, to the quenching choke 12.

The main valve 15 is alternately fired by a firing signal at its control path and cut off by a firing signal at the control path of the quenching valve 11 during variable time intervals.

The positive terminal 3 of the d-c voltage source 2 is connected with the one end of the secondary winding 8 of the transformer 7. To the other end of the secondary winding 8, the terminal 17 of a load 18 is connected via an uncontrolled series valve 15, e.g., a semiconductor diode, and via a choke 16, which is provided for smoothing. The other terminal 19 of the load 18, which load has an ohmic and an inductive load component, is connected with the negative terminal 4 of the d-c voltage source 2.

A controlled first by-pass valve 20 is connected on its one side, its cathode side, to the junction of the series valve 15 and the choke 16, and on the other side, its anode side, to the one end of the secondary winding 8.

To prevent cut-off losses, an uncontrolled valve (not shown) can further be connected in series with this by-pass valve 20. The series valve 15 and the controlled first by-pass valve 20 are to be considered as half-wave rectifiers as far as the secondary winding 8 is concerned.

Furthermore, a controlled second by-pass valve 21 is provided. This second by-pass valve 21 is connected with its cathode to the junction of the series valve 15 and the choke 16 and with its anode to the negative terminal 4 of the d-c voltage source 2. Thyristors, in particular, can be provided as the by-pass valves 20, 21. In some applications, e.g., if the d-c supply voltage U is nearly as high as the permissible reverse voltage of the main valve 5, the second by-pass valve 21 may be uncontrolled and designed as a semiconductor diode.

The transformer 7 further comprises a magnetization reversing winding 22. The latter is connected between the two terminals 3 and 4 of the d-c voltage source 2 via a smoothing choke 23 and a limiting resistor 24. The connection is made so that the magnetization reversal current driven by the d-c voltage source 2 via the magnetization reversal winding 22, the smoothing choke 23 and the limiting resistor 24 magnetizes the magnetic core of the transformer 7 in a direction which is opposite the direction of magnetization resulting from the primary current flowing in the primary winding 6.

It is assumed that a load current I(18) without breaks flows through the load 18. Thus, a base load is always to be there. However, the load 18 may vary in operation.

A control unit 25 is provided for alternatingly firing the main valve 5 and the quenching valve 11. The conduction time and/or the clock frequency of this control unit can be influenced by means of a control signal p at its control input. It is assumed here that only the conduction time $a$ of the main valve 5 is being controlled by the control signal p, the clock frequency being fixed.

A control unit 26 is provided for firing the first controlled by-pass valve 20. The former is designed as a timing stage, whose duration or delay time is settable by means of a control signal s. On the input side, the control unit 26 is addressed by the firing pulses of the second by-pass valve 21, which are furnished by a control unit 27. The control unit 26 thus always delivers a firing pulse at the point in time which lags the firing pulse of control unit 27 and, as a result, the current-take over of the second by-pass valve 21, by the settable delay time.

The control unit 27, which comprises essentially a comparator or a limit indicator, compares a limit U*, which is above the times-one value of the d-c supply voltage of the d-c voltage source 2, with a voltage which is a measure of the negative voltage at the secondary winding 8 of the transformer 7. The limit U* is furnished by an adjustable limit setter 28 which, in the present case, is shown as a potentiometer. The voltage U(10) at the quenching capacitor 10 serves as the voltage which is a measure of the negative voltage U(8) at the secondary winding 8. As shown, the voltage U(10) is taken from across the terminals 30, 31. To ensure that only the positive voltage U(10) is compared with the limit U*, a diode 29 is provided at the input of the control unit 27. This prevents a negative voltage U(10) from being passed on. The polarity of the negative voltage U(10) is seen from the sign of the charge at the quenching capacitor 10 in FIG. 1. Because of the voltage take-off at the quenching capacitor 10, the limit U* is chosen so that it is higher than twice the d-c supply voltage U. An isolating transformer, not specifically designated, is arranged in each of the firing lines of the valves 5, 11, 20, 21.

According to FIG. 1, there is further provided a control circuit which serves to keep the d-c output voltage U(18) constant. Instead of such a voltage regulating circuit, a power regulating circuit, for instance, may also be provided.

The control circuit includes a controller 32 which in the customary manner furnishes a control signal U(32) for the d-c control element which determines the duration of conduction of the main valve 5. The controller 32, which includes a comparator, determines the control signal U(32) by comparison of the d-c output voltage U(18) with a reference value U*(18), the latter reference value being taken off at a reference value transmitter 43, which is shown as a potentiometer. In dependence on this control signal U(32), the firing and extinguishing pulses of the main valve 5, as well as the firing pulses for the first controlled by-pass valve 20, can be controlled. A distribution circuit 33 ensures that the control signal U(32), depending on its magnitude end, therefore, on the deviation of the d-c output voltage U(18) from the reference value, influences either the firing of the main valve 5 or the firing of the first by-pass valve 20.

The distribution circuit 33 comprises a first circuit including a first resistor 34 in series with a first Zener diode 35, which circuit is acted upon by the control signal U(32). The voltage drop at the first Zener diode 35 is fed as the control signal p to the control unit 25. The distribution circuit 33 comprises, furthermore, a second circuit including a second resistor 36 in series with a second Zener diode 37, which circuit is likewise acted upon by the control signal U(32). The first Zener diode 35 and the second resistor 36 are connected to a common reference potential. The voltage drop taken off at the second resistor 36 is fed as the setting sigsnal s to the control unit 26. The Zener voltages $U_z$ of both Zener diodes 35, 37 are of equal magnitude here.

Figure 2:
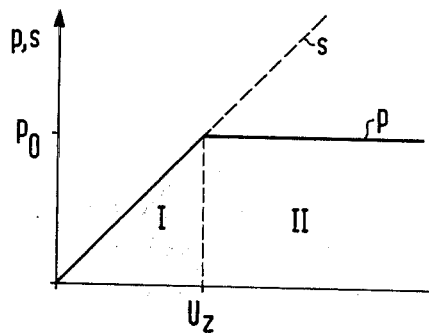
FIG. 2 shows the control signal characteristics for the single-ended dc-to-dc converter of FIG. 1.

To explain the operation of the distribution circuit 33, the control diagram in FIG. 2 will be referred to. More particularly, in FIG. 2 the courses of characteristics of the control signal p and the setting signal s are shown diagrammatically as a function of a control signal U(32). For a small control signal U(32), which corresponds to a short off time b and, therefore, to a high output voltage U(18), the control voltage p, shown as a solid line, increases linearly with the magnitude of the control signal U(32), while the setting signal s, shown as a dashed line, in zero. This region, for which U>U (18) holes, is identified by the reference symbol I. Here the time delay of the control unit 26 is zero, and the two by-pass valves 20, 21, are, therefore, fired simultaneously and at equidistant time intervals, and the d-c output voltage U(18) is varied by the on-off ratio $a/(a+b)$ of the d-c control element.

If the control signal U(32) has reached the magnitude of the Zener voltage $U_z$, which is to be considered as a threshold value, the situation is reversed. The Zener voltage is chosen so that this reversal takes place at the point at which U(18) = U holds. For an increasing control signal U(32) in the region II, where the relation U>U(18) holds, the setting signal s (dashed line) increases linearly with the control signal U(32), while the control signal p (solid line) is held constant at a value of $p_o$. In other words, in this range II, the on-off ratio $a/(a+b)$ of the d-c control element is kept constant by the control signal p, and the firing of the first by-pass valve 20 is varied in accordance with the setting signal s.

The choice of the operating point in the control diagram according to FIG. 2 and, therefore, the choice of whether the d-c output voltage U(18) is in region I or II, is made by the adjustment at the reference transmitter 43. The control circuit ensures that the d-c output voltage U(18) is kept constant at the set operating point.

Figure 3:
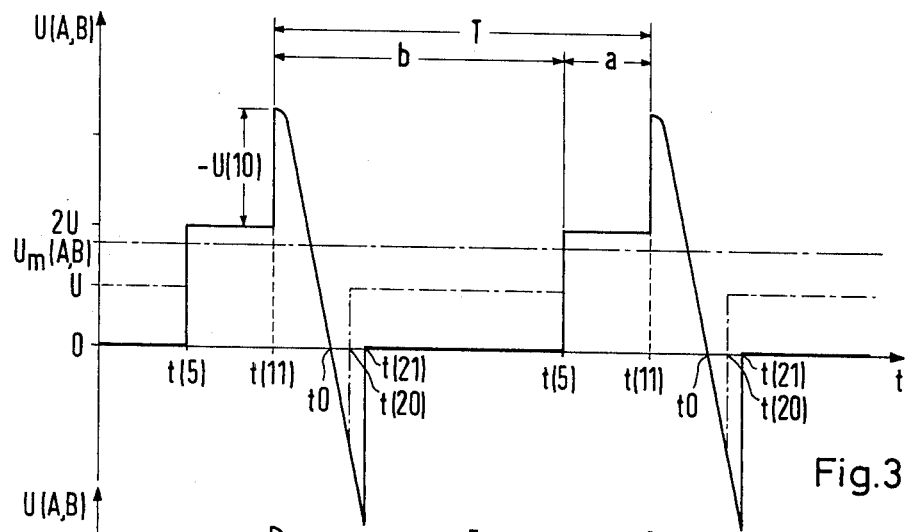
FIG. 3 illustrates a voltage-vs-time characteristic for the voltage across a particular one of the by-pass valves of the converter of FIG. 1.
Figure 4:
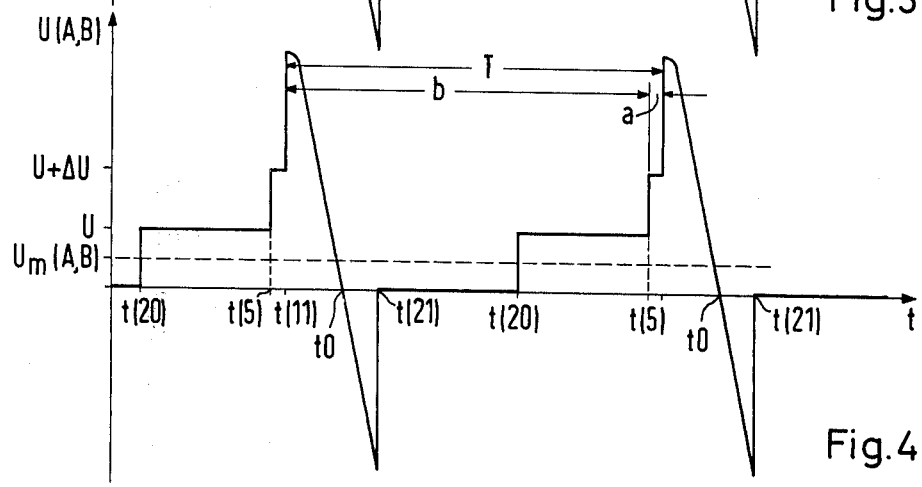
FIG. 4 shows another voltage-vs-time characteristic for the voltage across the aforementioned particular by-pass valve.

In FIGS. 3 and 4 the waveform of the voltage U(A, B) taken between the points A and B at the cathode-anode path of the second by-pass valve 21 is shown as a function of the time t. In the discussion to follow it has been assumed that the quenching capacitor 10 in FIG. 1 has been first charged so that it is of opposite polarity to that shown in FIG. 1, that is, that it has been charged positive. The capacitor electrode connected with the anode of the main valve 5 is, thus, assumed to be initially positively charged relative to the other capacitor electrode, which is connected with the quenching valve 11.

If now the main valve 5 is fired by the control unit 25 at a time t(5), the main valve 5 takes over not only the primary current through the primary winding 6, but also the charge-reversal current of the quenching capacitor 10. This charge-reversing current flows through the main valve 5, the charge-reversing choke 14 and the charge-reversing valve 13. As long as the main valve 5 is fired, a positive voltage, which is composed additively of the d-c supply voltage U and the secondary voltage U(8), exists between the points A and B. This secondary voltage U(8) is induced in the secondary winding 8. The polarity of the secondary voltage U(8) is marked in FIG. 1 by an arrow. When the charge reversal process of the quenching capacitor 10 is completed the quenching capacitor 10 is charged with the polarity shown, i.e., negative.

At a latter time t(11), which is after the firing point t(5) by the "on" duration a, the quenching valve 11 is fired by the control unit 25 to initiate the quenching of the main valve 5. In general, the time spacing between two quenching times t(11) is kept constant. This spacing in time is then equal to the duration of the period T = (a + b). The on-off ratio $a/(a+b)$ can be adjusted by shifting the firing times t(5) relative to the quenching times t(11) by means of the control signal p.

The quenching capacitor 10 first interrupts the current conduction of the main valve 5. Then, it is reversely charged via the quenching valve 11, the quenching choke 12, the series valve 9, the primary winding 6 and the d-c voltage source 2. In the process, it reassumes the initial polarity, which, as above-indicated, is opposite to that indicated in FIG. 1. The electrode facing the main valve 5 thus assumes again a positive potential and the electrode facing the quenching valve 11, a negative potential.

This charge reversal of the quenching capacitor 10 will now be discussed in further detail. In particular, at the point of extinction t(11), the d-c voltage source 2 and the quenching capacitor 10 are connected in series with the primary winding 6. The voltage U(A, B) between the points A and B is therefore composed of the d-c input voltage U and a component which is induced in the secondary winding 8 because of this series connection. With a turns ratio of 1:1, which is always assumed in the following, this secondary voltage U(8) is equal to the d-c supply voltage U plus the capacitor voltage U(10).

With decreasing charge of the quenching capacitor 10, i.e., with progressing reverse charge, the capacitor voltage U(10) and therewith, the induced secondary voltage U(8), diminishes, thereby causing the voltage U(A, B) to also decrease. When the capacitor voltage U(10) has reached the value zero, the secondary voltage U(8) = U, so that the further reduced voltage U(A, B) = 2U is present between the points A and B. When the positive capacitor voltage U(10) at the re-charged quenching capacitor 10 has become equal to the d-c input voltage U, then the d-c voltage source 2 and the quenching capacitor 10 are connected bucking each other. The secondary voltage U(8) is now zero, and the voltage U(A, B) = U, i.e., just the d-c supply voltage U, is present between the points A and B.

It is further assumed that the by-pass valves 20 and 21 are not yet fired, so that the load current I(18) cannot commutate to either of these two by-pass valves. Therefore, the quenching capacitor is continued to be reverse-charged. The capacitor voltage U(10) of the quenching capacitor 10 therefore continues to rise (with a polarity opposite to that shown). When it reaches at a time $t_0$ the value U(10) = 2U, then the secondary voltage U(8) has assumed the value U(8) = −U. The secondary voltage thus is negative now, and it now has a polarity opposite to that indicated by the arrow at the secondary winding 8 in FIG. 1. The voltage U(A, B,) between the points A and B is therefore zero. This point in time $t_0$ is specially marked in FIGS. 3 and 4 by the reference symbol $t_0$.

It is significant that from the time $t_0$ on with progressive recharging of the quenching capacitor 10 beyond the value U(10) = 2U, the voltage between the points A and B becomes negative. The anode of the controlled by-pass valve 21 therefore becomes positive relative to the cathode, so that the by-pass valve 21 can carry current from the time $t_0$ on. The negative portions in the waveform of the voltage U(A, B) can be seen in FIGS. 3 and 4.

In the following discussion, the effect of the firing of the two by-pass valves 20 and 21 shown in FIG. 1 will be explained for the operating cases. The first two operating cases assume that the one by-pass valve 20 or 21 is fired, while the other remains permanently blocked and carries no current; the third operating case assumes the simultaneous firing of both by-pass valves 20, 21; and the fourth operating case treats a time-shifted firing of both by-pass valves 20, 21.

Operating Case 1:

In this case, the second by-pass valve 21 is fired at an adjustable time $t(21)$, which, as shown in FIG. 3, is after the point in time $t_0$. It is assumed here that when this second by-pass valve 21 fires, the first by-pass valve 20 is omitted or cut off. The second by-pass valve 21 therefore first at a time $t(21)$ at which the positive voltage U(10) at the quenching capacitor 10 exceeds the predetermined limit U*, which is higher than twice the value of the d-c supply voltage U. As indicated by the limit setter 28, this limit U* is adjustable, so that also the time $t(21)$ can be set via this limit U*.

As long as the controlled by-pass valve 21 has not fired, the recharging of the quenching capacitor 10 continues undiminished. Only when the control unit 27 ascertains that the condition U(8) = U*>2U is fulfilled, does it deliver a firing pulse to the controlled by-pass valve 21. At this moment, the voltage U(A, B) goes to 0 V, according to FIG. 3, and the recharging of the quenching capacitor 10 by the primary current is terminated very quickly. The point in time $t(21)$ is chosen by means of the limit U* so that the quenching capacitor 10 is sufficiently overcharged even if the d-c supply voltage is low. The voltage U(A, B) remains at the value 0, until at the next time $t(5)$ the main valve 5 is fired again. During this time interval the inductive energy stored in the choke 16 and in the inductive load component can be converted into heat in the closed circuit 16, 17, 18, 19, B, 21 and A. A secondary current through the secondary winding 8 cannot flow during this period. The voltage waveform U(A, B) given is shown in FIG. 3 by a solid curve.

Operating Case 2:

In this case, the first by-pass valve 20 is now fired instead of the second by-pass valve 21. As shown in FIG. 3, the firing is effected by the control unit 26 at a settable point in time $t(20)$, which is after the point in time $t_0$. It is assumed here that when the first by-pass valve 20 fires, the second by-pass valve 21 is omitted or cut off. The first by-pass valve is therefore also fired at a time $t(20)$ when the positive voltage U(10) at the quenching capacitor 10 exceeds a limit which is not specifically designated and which is higher than twice the value of the d-c supply voltage U. This limit is assumed to be settable and further to be lower than the limit U*. The point in time $t(20)$ in the example according to FIG. 3 is, therefore, closer to the time $t_0$ than the time $t(21)$.

When the first by-pass valve 20 fires at the same $t(20)$, it shorts the series circuit consisting of the secondary winding 8 and the series valve 15. From then on, the secondary winding 8 can no longer make a contribution of the voltage U(A, B) which, according to the dot-dashed waveform in FIG. 3, is suddenly lifted to the times-one value of the d-c supply voltage U. It keeps this value until, at the time $t(5)$, the main valve 5 fires. During this time interval the load current I(18) can flow in the closed circuit A, 16, 17, 18, 19, B, 4, 2, 3 and 20. It is noteworthy that the average $U_m$ (A, B) of this voltage U(A, B) is above the value of the d-c supply voltage. This is emphasized in FIG. 3, by a dot-dashed horizontal line.

Operating Case 3:

The voltage U(A, B) is a measure of the d-c output voltage U(18) at the load 18. In the case that this d-c output voltage U(18) is to be higher than the d-c supply voltage U, one will proceed in practice so that the first and the second controlled by-pass valve 20 and 21, respectively, are fired together at the time $t(20)$ = $t(21)$. The points in time $t(20)$ and $t(21)$ in FIG. 3 therefore coincide. To vary the average value $U_m(A, B)$ and therefore, the d-c output voltage U(18), the common firing time $t(20) = t(21)$ is kept constant at a value in the range between the point in time $t_0$ and the time $t(5)$. The "on" ratio $a/T$ of the d-c control element is changed in this arrangement. It determines the magnitude of the d-c output voltage U(18). This mode of operation corresponds to a variable operating point in the region I in the control diagram of FIG. 2.

Operating Case 4:

It will be seen from FIG. 4 that in the case that the d-c output voltage U(18) is to be smaller than the d-c supply voltage U, the points in time $t(21)$ and $t(20)$ and be chosen different. One proceeds here so that the on-off ratio $a/(a+b)$ is chosen smaller than in the operating case 3. First, the second controlled by-pass valve 21 is fired at a point in time $t(21)$ at which the absolute value of the positive voltage U(10) at the quenching capacitor 10 exceeds the predetermined limit U*. Afterwards, the first controlled by-pass valve 20 is first at a point in time $t(20)$ which is after the first-mentioned point in time $t(21)$ by a predetermined time interval. In this case, to change the average $U_m(A, B)$, which is shown as a dotted line in FIG. 4, and therefore, to change the d-c output voltage U(18), the on-off ratio $a/(a+b)$ is kept constant, the point in time $t(21)$ for firing the second by-pass valve 21 is fixed in a periodic manner, and the point in time $t(20)$ for firing the first by-pass valve 20 is varied. This change is effected by means of the setting signal s at the control unit 26 according to FIG. 1. This mode of operation corresponds to variable operating point in the control diagram of FIG. 2. A transition between the operating cases 3 and 4 is, of course, possible.

Figure 5:
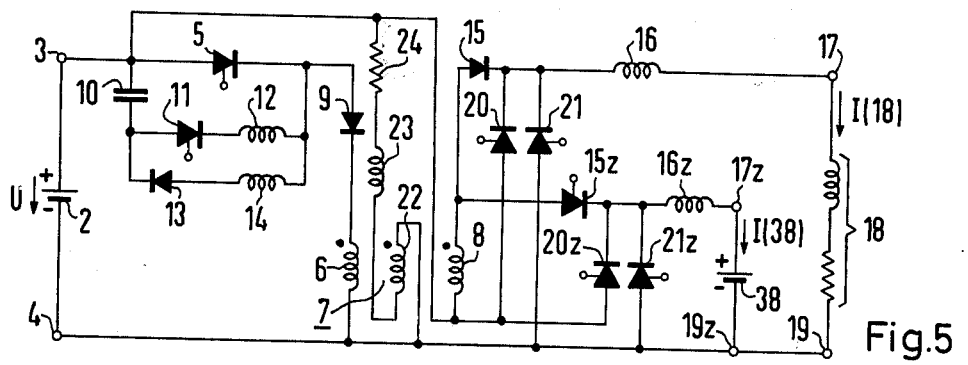
FIG. 5 illustrates a single-ended dc-to-dc converter of the type shown in FIG. 1 which has been modified so as to simultaneously supply a load and a battery.

In FIG. 5, the single-ended dc-to-dc converter shown in FIG. 1 is supplemnted by several components which comprise a further load circuit arranged similarly to the one in FIG. 1. The individual components added are identified by a suffix z.

According to FIG. 5, the terminal 17z of a battery 38 is connected to the other end of the winding 8, i.e., to the end not connected with the terminals, via a further series valve 15z, which is preferably of the controlled design, and via a further choke 16z. The other terminal 19z of the battery 38 is connected with the negative terminal 4 of the d-c voltage source 2. The series circuit comprised of the secondary winding 8 and the further series valve 15z is shunted by a further controlled by-pass valve 20z, the cathodes of the latter two valves being connected with each other. Further, the series circuit comprised of the further choke 16z and the battery 38 is shunted by a further second controlled by-pass valve 21z, which is poled in the direction of the charging current I(38). The by-pass valves 20z and 21z may, typically, be thyristors.

The operation of this output circuit provided with the suffic z is the same as that of the already explained output circuit. Both output circuits may be provided here with a separate control circuit corresponding to that in FIG. 1. However, it it possible to generate different d-c output voltages U(18) and U(38) at the two loads 18, 38. In particular, it is possible to keep the d-c output voltage U(18) higher and the d-c output voltage U(38) smaller than the d-c supply voltage U. It is thereby possible to supply the load 18 in normal operation with a controlled or regulated d-c output voltage U(18), while at the same time the battery 38 is charged or recharged in a controlled or regulated manner. In the event of trouble in the supply by the d-c voltage source 2, the battery 38 can be connected in place of this d-c voltage source 2 to the input of the single-ended dc-to-dc converter (by means of a switching-over arrangement, not shown) and thus be used to maintain the voltage supply at the load 18. The single-ended dc-to-dc converter according to FIG. 5 thus constitutes an emergency plant.

In conclusion, it should further be pointed out that a controlled valve, for instance, a thyristor, can be used as the further series valve 15z. With a series valve 15z of controlled design, particularly low d-c output voltage U(38) can be produced. This series valve 15z is fired at the time t(5) together with the main valve 5 or after the latter. Thereby, the conduction period of the series valve 15z is reduced to a minimum which can be smaller than the conduction period $a$ of the main valve 5.

What is claimed is:
1. A single-ended dc-to-dc converter for use with a d-c voltage source and for providing pulse control of the voltage at an inductive load comprising:
   a transformer including primary, secondary and magnetization reversal windings;
   switch means for connecting said primary winding to said voltage source;
   a first circuit means for connecting said secondary winding to said load, said first circuit means including a series valve connected to a choke;
   limiting resistor means for connecting said magnetization winding to said voltage source such that the magnetization reversal current which flows through said magnetization reversal winding magnetizes the magnetic core of said transformer in the opposite direction as the primary current in said primary winding;
   a first controlled by-pass valve connected in shunt with a first series circuit comprising said series valve and said secondary winding;
   and a second by-pass valve connected in shunt with a second series circuit comprising said choke and said load, said second by-pass valve being poled in the direction of the current in said load.
2. A converter in accordance with claim 1 in which said second by-pass valve is controlled.
3. A converter in accordance with claim 2 in which said first and second by-pass valves are thyristors.
4. A converter in accordance with claim 3 in which:
   one end of said series valve and one end of said choke are connected to form a common junction;
   the other end of said choke is connected to one end of said load;
   the other end of said series valve is connected to one end of said secondary winding;
   the cathode and anode of said first by-pass valve are connected, respectively, to said common junction and to the other end of said secondary winding;
   and the cathode and anode of said second by-pass valve are connected, respectively, to said common junction and the other end of said load.
5. A converter in accordance with claim 2 which further includes:
   a first control unit including a comparator for firing said second by-pass valve, said control unit providing a firing pulse when a first voltage indicative of the negative voltage at said second winding exceeds a limit voltage which is above the d-c supply voltage of said voltage source.
6. A converter in accordance with claim 5 in which:
   said transformer has a turns ratio substantially equal to 1:1;
   said switch means includes a controlled main valve and a quenching arrangement, said quenching arrangement comprising a quenching capacitor and being connected in shunt with said main valve;
   said first voltage comprises the voltage across said quenching capacitor;
   and said converter further includes means for applying said voltage across said quenching capacitor to said first control unit.
7. A converter in accordance with claim 6 which further includes:
   means for developing said limit voltage which permits adjustment thereof;

and means for applying said limit voltage to said control unit.

8. A converter in accordance with claim 5 in which:
the d-c output voltage provided at said load has a value below that of said d-c supply voltage;
said converter further includes a second control unit for providing firing pulses to said first controlled by-pass valve.

9. Apparatus in accordance with claim 8 in which said second control unit comprises a timing device which is responsive to the firing pulses generated by said first control unit.

10. A converter in accordance with claim 8 in which said second control unit fires a pulse at a point in time when said second by-pass valve is fired and takes over current.

11. A converter in accordance with claim 8 in which said second control unit fires a pulse at a point in time which is a predetermined time interval after the point in time at which said second by-pass valve is fired and takes over current.

12. A converter in accordance with claim 11 in which said predetermined internval can be set by a timing signal.

13. A converter in accordance with claim 12 which further includes:
a third control unit for controlling said switch means;
and a control means for generating first and second output voltages, said first output voltage comprising said setting signal and being applied to said second control unit and said second output voltage being applied to said third control unit.

14. A converter in accordance with claim 13 in which said control means includes:
a controller circuit for developing a control signal;
and a distribution circuit responsive to said control signal for developing said first and second output voltages.

15. A converter in accordance with claim 14 in which said distribution circuit causes said first output voltage to be zero until said control signal reaches a predetermined threshold value and, thereafter, causes said first output to increase proportionally to said control signal.

16. A converter in accordance with claim 1 which further includes:
a battery;
a second circuit means for connecting said battery to said secondary winding, said second circuit means comprising a second series valve connected to a second choke;
a third controlled by-pass valve connected in shunt with a third series circuit including said secondary winding and said second series valve;
and a forth by-pass valve connected in parallel with a fourth series circuit including said second choke and said battery, said fourth by-pass valve being poled in the direction of the current charging said battery.

17. A converter in accordance with claim 16 in which said fourth by-pass valve is controlled.

18. A converter in accordance with claim 17 in which each of said by-pass valves is a thyristor.

19. A converter in accordance with claim 16 in which said second series valve is controlled.

20. A method of operating a single-ended dc-to-dc converter;
said converter being of a type which is used with a d-c voltage source, provides pulse control of the voltage at an inductive load, and comprises:
a transformer including primary, secondary and magnetization reversal windings;
switch means for connecting said primary winding in said voltage source;
a first circuit means for connecting said secondary winding to said load, said first circuit means including a series valve connected to a choke;
limiting resistor means for connecting said magnetization winding to said voltage source such that the magnetization reversal current which flows through said magnetization reversal winding magnetizes the magnetic core of said transformer in the opposite direction as the primary current in said primary winding;
a first controlled by-pass valve connected in shunt with a first series circuit comprising said series valve and said secondary winding;
and a second controlled by-pass valve connected in shunt with a second series circuit comprising said choke and said load, said second by-pass valve being poled in the direction of the current in said load;
said method comprising the step of firing said first and second by-pass valves together at a point in time in each of a number of time periods when the absolute amount of negative voltage at said secondary winding exceeds a predetermined limit, said limit being above the supply voltage of said source.

21. A method in accordance with claim 20 in which:
said step of firing is such that firing occurs at the same relative point in time in each of said periods; and
said method further includes the step of varying the "on" ratio of said switch means.

22. A method of operating a single-ended dc-to-dc converter;
said converter being of a type which is used with a d-c voltage source, provides pulse control of the voltage at an inductive load, and comprises:
a transformer including primary, secondary and magnetization reversal windings;
switch means for connecting said primary winding to said voltage source;
a first circuit means for connecting said secondary winding to said load, said first circuit means including a series valve connected to a choke;
limiting resistor means for connecting said magnetization winding to said voltage source such that the magnetization reversal current which flows through said magnetization reversal winding magnetizes the magnetic core of said transformer in the opposite direction as the primary current in said primary winding;
a first controlled by-pass connected in shunt with a first series circuit comprising said series valve and said secondary winding;
and a second controlled by-pass valve connected in shunt with a second series circuit comprising said choke and said load, said second by-pass valve being poled in the direction of the current in said load; said method comprising the steps of:
firing said second by-pass valve at a point in time in each of a number of time periods when the absolute amount of negative voltage at said secondary winding exceeds a predetermined limit, said limit being above the supply voltage of said source;

and firing said first by-pass valve at a point in time in each of said periods which is after said point in time at which said second by-pass valve is fired in such period by a predetermined time interval.

23. A method in accordance with claim 22 in which:

the step of firing said second by-pass valve is such that firing occurs at the same relative point in time in each of said intervals;

the step of firing said first by-pass valve is such that said predetermined time interval is varied;

and said method further includes the step of holding the "on" ratio of said switch means constant.

* * * * *

UNITED STATES PATENT AND TRADEMARK OFFICE
CERTIFICATE OF CORRECTION

PATENT NO. : 3 947 746
DATED : March 30, 1976
INVENTOR(S) : Harald Heinicke

It is certified that error appears in the above-identified patent and that said Letters Patent are hereby corrected as shown below:

Column 5, line 39, change "signal s" to --signals--.

Column 5, line 53, change "holes" to --holds--.

Column 8, line 65, change "and" (2nd occurrence) to --must--.

Column 11, claim 12, line 24, change "internval" to --interval-.

Column 11, claim 12, line 24, change "timing" to --setting--.

Signed and Sealed this

Twentieth Day of July 1976

[SEAL]

Attest:

RUTH C. MASON
Attesting Officer

C. MARSHALL DANN
Commissioner of Patents and Trademarks